July 24, 1934.  F. AHLBURG  1,967,732
FRUIT COUNTER
Filed Sept. 21, 1931  4 Sheets-Sheet 1
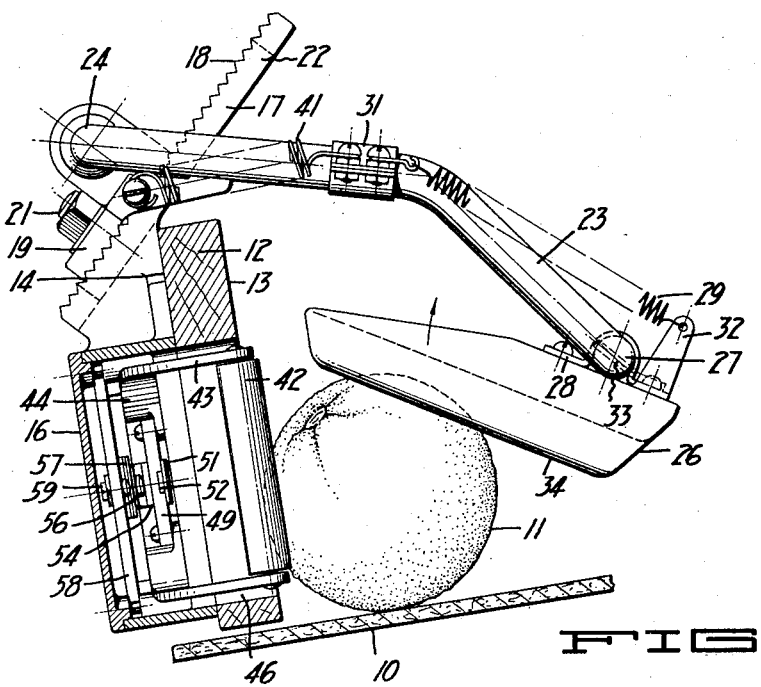
FIG_1_
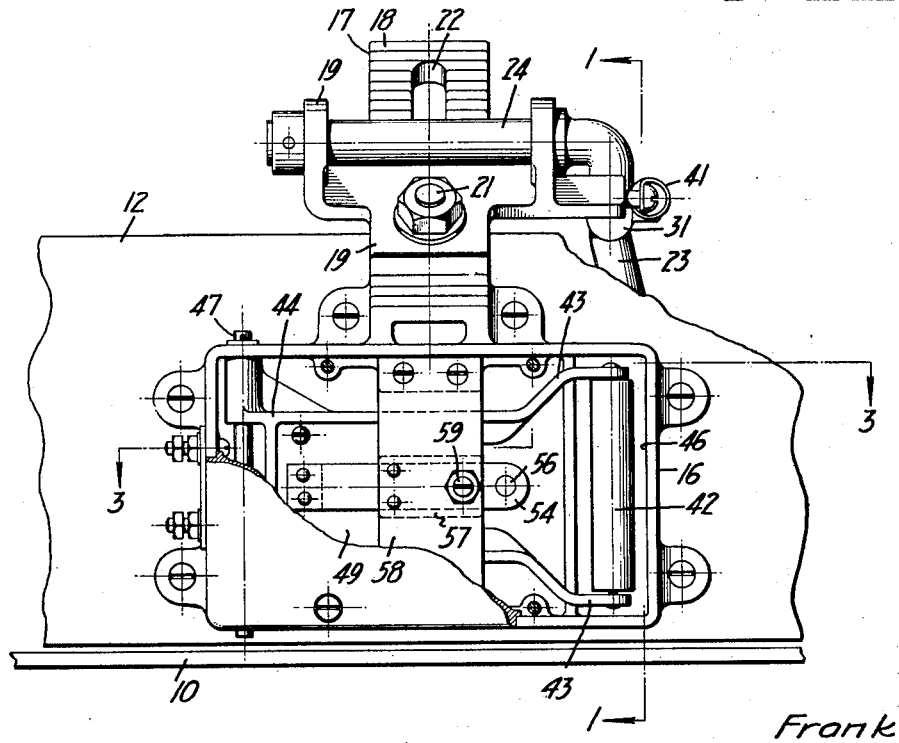
FIG_2_
INVENTOR.
Frank Ahlburg
BY
White, Prost, Hehr & Lothrop
ATTORNEYS.

July 24, 1934.     F. AHLBURG     1,967,732
FRUIT COUNTER
Filed Sept. 21, 1931     4 Sheets-Sheet 2
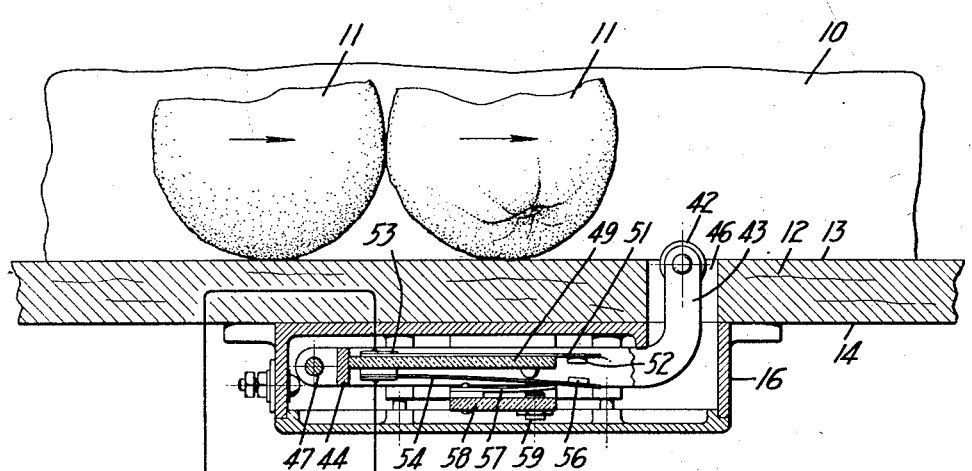
FIG_3_
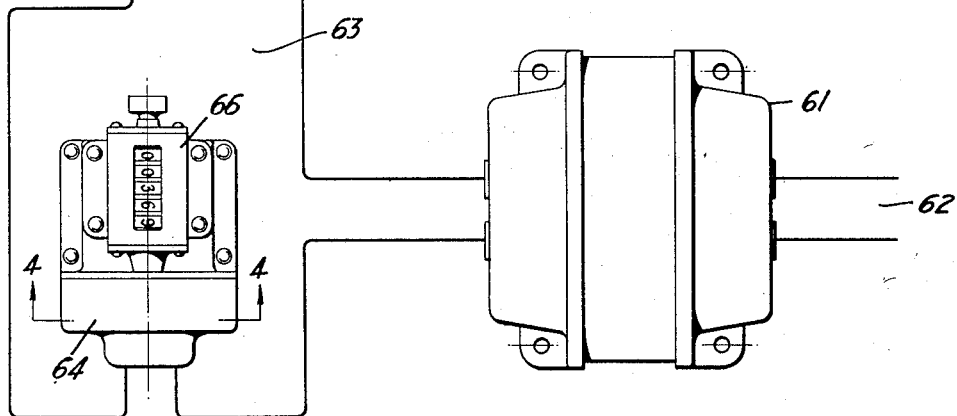
FIG_4_
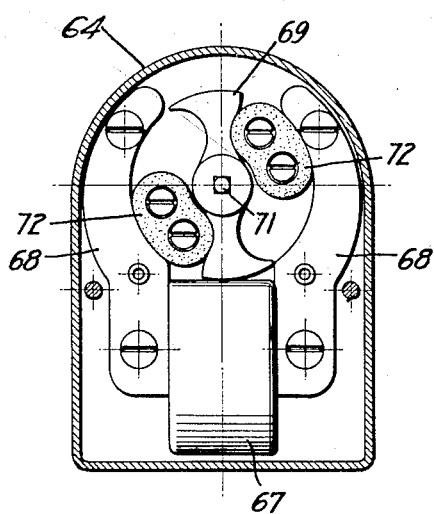
INVENTOR.
Frank Ahlburg
BY
White, Prost, Hehr & Lothrop
ATTORNEYS.

July 24, 1934.  F. AHLBURG  1,967,732
FRUIT COUNTER
Filed Sept. 21, 1931  4 Sheets-Sheet 3
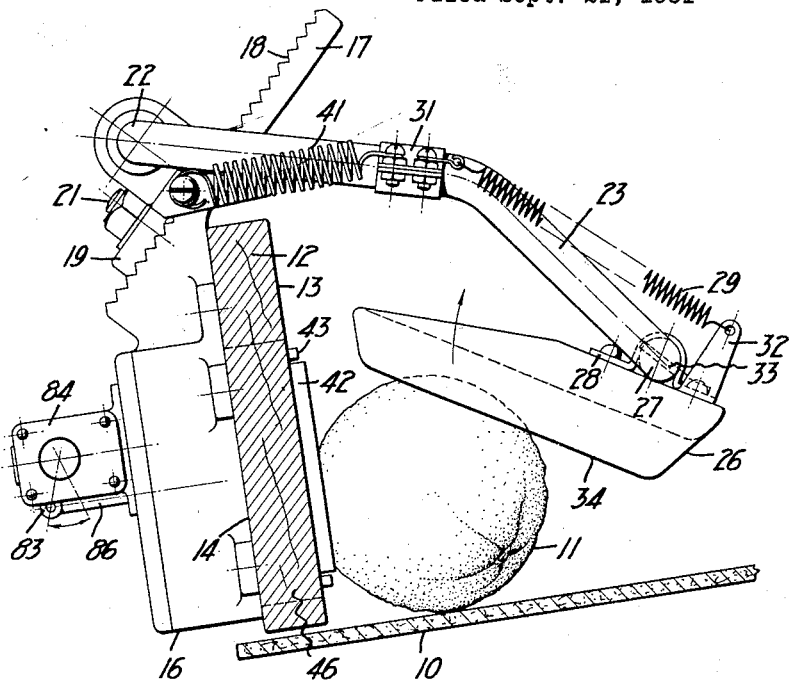
FIG_5_
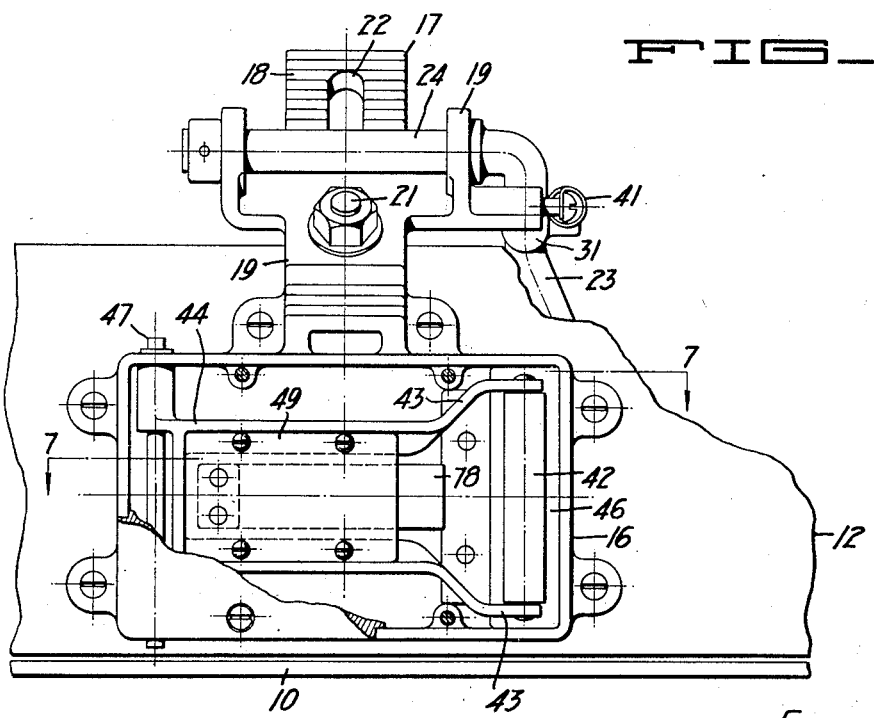
FIG_6_
INVENTOR.
Frank Ahlburg
BY White, Prost, Fehr & Lothrop
ATTORNEYS.

July 24, 1934.　　　　F. AHLBURG　　　　1,967,732
FRUIT COUNTER
Filed Sept. 21, 1931　　　4 Sheets-Sheet 4
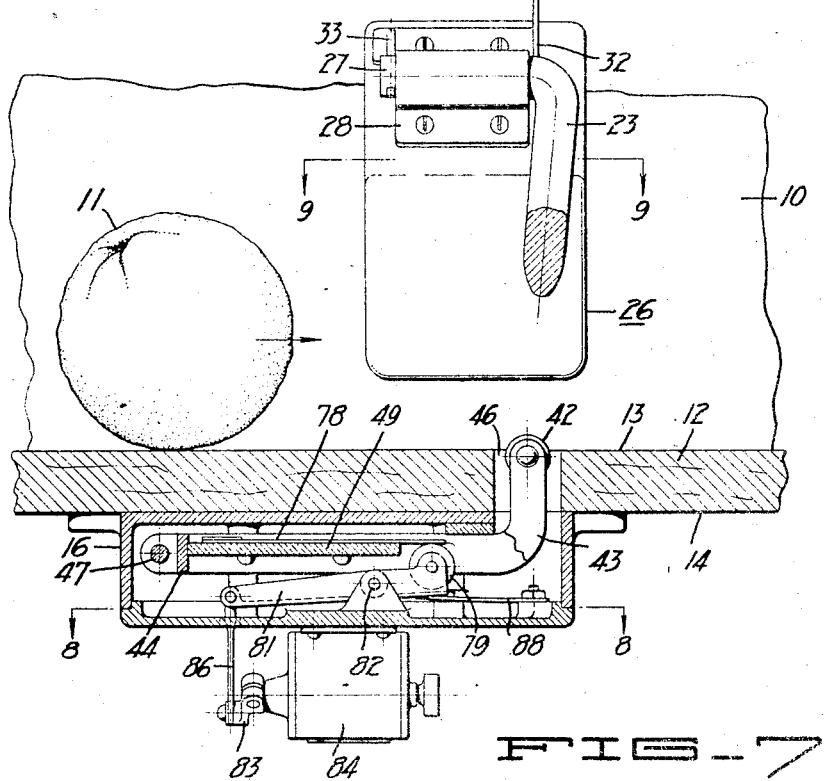
FIG-7-
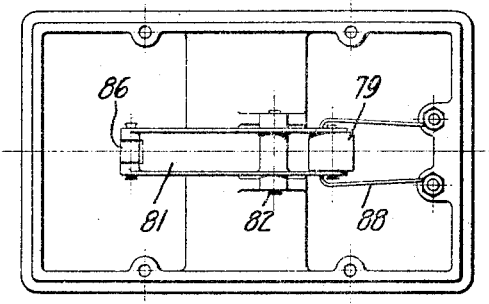
FIG-8-
FIG-9-
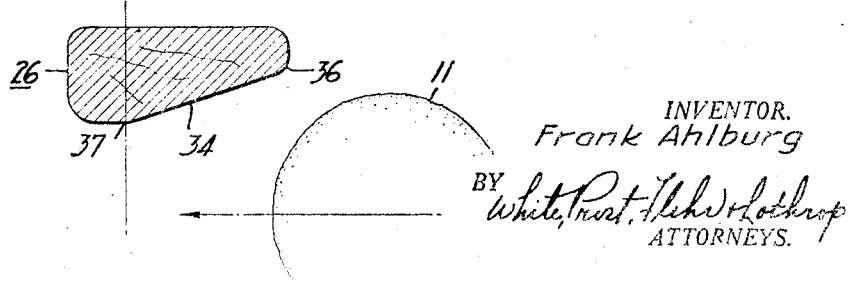
INVENTOR.
Frank Ahlburg
BY White, Prost, Hehr & Lothrop
ATTORNEYS.

Patented July 24, 1934

1,967,732

UNITED STATES PATENT OFFICE 1,967,732

FRUIT COUNTER

Frank Ahlburg, Los Angeles, Calif., assignor to Ahlburg Co., Ltd., Los Angeles, Calif., a corporation of California Application September 21, 1931, Serial No. 563,959

5 Claims. (Cl. 235—98)

This invention relates generally to devices for counting individual articles or various fruits, and is designed particularly for use in conjunction with various fruit handling machines.

In the handling of various fruits, such as oranges, grapefruit, lemons or apples, preparatory to shipment, it is customary practice to count the number of fruit in different consignments or the number handled over a certain period of time. The handling may be in conjunction with processing the fruit- marking or grading the same, or for the particular purpose of effecting a count. This practice is particularly prevalent in cooperative associations, where it is necessary to keep strict account of the numbers of articles of fruit received from various members. In the past various counting devices have been proposed and have been used with limited success. The main difficulties with such prior counting devices have been lack of accuracy, and lack of adaptability to fruit of different sizes and shapes.

It is an object of the present invention to devise a fruit counter which can be used in conjunction with fruit handling machines, and which will be characterized by a high degree of accuracy and by utmost adaptability to fruit of different sizes and shapes.

It is a further object of the invention to devise a fruit counter which is relatively simple and rugged in construction, and which can be readily installed and adjusted.

Further objects of the invention will appear from the following description in which the preferred embodiments of the invention have been set forth in detail in conjunction with the accompanying drawings. It is to be understood that the appended claims are to be accorded a range of equivalents consistent with the state of the prior art.

Referring to the drawings:

Figure 1 is a side elevational view, in cross section illustrating a counter incorporating the present invention.

Fig. 2 is a view looking at the left hand side of Fig. 1, certain parts being broken away to reveal operating members.

Fig. 3 is a cross sectional detail taken along the line 3—3 of Fig. 2, and showing electrical registering means cooperating with the counter.

Fig. 4 is a cross sectional detail along the line 4—4 of Fig. 3, and showing an electromotive device for operating the register.

Fig. 5 is a view similar to Fig. 1, illustrating a modification of my counter in which the register is operated by mechanical rather than electrical means.

Fig. 6 is a view looking toward the left of Fig. 5, with certain parts broken away.

Fig. 7 is a cross sectional detail taken along the line 7—7 of Fig. 6.

Fig. 8 is a cross sectional detail taken along the line 8—8 of Fig. 7.

Fig. 9 is a cross sectional detail taken along the line 9—9 of Fig. 7.

Referring to Figs. 1 and 2, I have shown a fruit conveying apparatus including an endless belt 10 adapted to carry articles of fruit 11. Extending along the upper side of belt 10 there is what is commonly termed a runboard 12. In Fig. 1 belt 10 is shown in transverse cross section, and it is to be understood that runboard 12 extends in the direction of movement of the belt. Board 12, or at least the side 13 of the board, extends substantially at right angles to the plane of the belt. In order to cause the fruit to tend to move towards the board 12, belt 10 is shown at a slight inclination to the horizontal, and board 12 is likewise slightly inclined with respect to the vertical. Conveying devices of this type are commonly utilized in various fruit handling machines, particularly those adapted for the handling of citrus fruit and apples.

Mounted upon the outer side 14 of runboard 12, there is a box-like housing 16, which encloses certain working parts of my counter. Carried upon the upper portion of housing 16 there is a bracket 17, the upper surface of which can be provided with teeth 18. Note that the general plane of the upper surface of bracket 17 as viewed in Fig. 1 extends at substantially 45° with respect to the general plane of runboard 12, the reason for which will be presently explained.

Carried by the upper surface of bracket 17 there is a journal block 19 having teeth formed to engage teeth 18 of the bracket. Bolt 21 extending thru a slot 22 in bracket 17, serves to clamp the journal block to a desired position. It is obvious that by loosening bolt 21, journal block 19 can be set to any desired position along bracket 17, after which the block is securely clamped in position upon tightening the bolt.

Extending over the belt 10 there is an arm 23, having a laterally bent portion 24 pivotally carried by journal block 19. As is evident from Fig. 2, the pivotal axis of arm 23 is substantially parallel to belt 10, and longitudinal of runboard 12. Carried by the free end of arm 23 there is a fruit engaging presser member 26, which in this instance is in the form of a block made of suitable material such as wood. Presser member 26 is preferably elongated, the axis of its major dimensions being in a direction lateral to the runboard 12 and the direction of movement of belt 10. Its one end portion is provided with a pivotal connection to the free end of arm 23, this connection as illustrated consisting of a laterally bent portion 27 upon the free end of arm 23, which is engaged by a U-shaped strap 28 secured to the upper surface of block 26.

Block 26 is preferably biased so that it tends to rotate in a counterclockwise direction with respect to arm 23, as viewed in Fig. 1. Such a bias can be afforded by a tension spring 29, one end of which is connected to a clamp 31 secured to arm 23, and the other end of which is connected to an arm 32 mounted upon block 26. Rotation of block 26 under the urge of spring 29 is limited by a pin 33, secured to arm 23. The lower surface 34 of block 26 is relatively planar as shown in Fig. 9, and merges with the side surfaces of block 26 by curved surfaces 36 and 37. As shown in Fig. 9 it will be noted that surface 34 is inclined with respect to the path of the fruit moving toward the block 26, and is also evident from Fig. 1, the plane of this surface, when block 26 is in normal position and not engaged by an article of fruit, extends at an acute angle with respect to both the plane of the belt 10 and the plane of the side 13 of runboard 12.

Because of the weight of arm 23, and the block 26 and other parts attached to the same, this arm is biased by gravity downwardly toward belt 10. In most instances it is desirable to provide an additional bias in the form of a tension spring 41. One end of this spring is shown attached to clamp 31 and the other end connected to block 19.

As will be presently explained in detail, presser block 26 in conjunction with arm 23, serves to press or urge fruit passing under the same into engagement with the inner side 13 of the runboard 12. As a means for counting the fruit passing beneath block 26, I provide mechanism including a member which projects into the path of movement of the fruit beyond the side 13 of the runboard. The device as illustrated consists of a small roller 42, the ends of which are pivotally carried by the laterally extending branches 43 of a yoke like lever 44. The main portion of lever 44 is carried within housing 16, while branches 43 extend thru a vertical slot 46 in runboard 12 (Fig. 1). Lever 44 is pivotally connected to housing 16, to oscillate on an axis substantially parallel to runboard 12, by the pivot pin 47.

While movements of lever 44 can be directly translated mechanically to movements of a counter, it is convenient in many instances to locate the counter at a remote point, and to operate the same by an electrical circuit controlled by contacts opened and closed by movements of lever 44. Thus as appears more clearly in Fig. 3, carried by lever 44 there is a plate 49 of insulating material. Extending along the inner side of plate 49 there is a spring strip 51, one end of which carries an electrical contact 52 and the other end of which is fixed to plate 49 as indicated at 53. Extending along the outer side of plate 49, there is another spring strip 54, one end of which is likewise mounted upon plate 49, and the other end of which carries an electrical contact 56 cooperating with contact 52. For adjusting the contacts 52 and 56, there is shown another spring strip 57, one end of which is fixed to an insulating member 58, which in turn is mounted upon casing 16. The free end of strip 57 engages strip 54, and can be flexed within limits to a desired adjusted position, by means of set screw 59. Spring strip 54 not only serves to carry the contact 56, but when in abutment with the strip 57 also serves to bias lever 44 in a direction to normally project at least a portion of roller 42 beyond the plane of side 13 of the runboard (Fig. 1). It will also be noted that in the normal position of roller 42 as shown in Fig. 1, the axis of rotation of this roller is substantially parallel to the plane of side 13 of the runboard, although substantially at right angles to the plane of belt 10. When roller 42 is engaged by an article of fruit it is free to move into slot 46, in a direction lateral of its axis of rotation, thus causing contacts 52 and 56 to be closed.

A suitable electrical circuit for cooperating with contacts 52 and 56 is illustrated in Fig. 3. In this case the circuit includes a stepdown transformer 61 having its primary connected to standard alternating current supply lines 62. The secondary transformer 61 is connected to an electrical circuit 63 which includes contacts 52 and 56, and electromotive device 64, in series relation. Electromotive device 64 serves to operate the counter 66. A novel form of motive device 64 is illustrated in Fig. 4 and is formed by a field winding 67 connected to circuit 63, and serving to magnetize the arcuate pole pieces 68. Between the pole pieces 68 there is an armature 69, mounted upon rotatable shaft 71. Shaft 71 is mechanically connected to the counter 66. Rotation of armature 69 is limited by the stationary stops 72 made of suitable resilient material, such as soft vulcanized rubber.

To outline the complete mode of operation of the device described above, as an article of fruit 11 is carried along by the belt 10, it is brought into contact with the presser block 26. By a rolling motion, (by virtue of contact with belt 10) it moves beneath block 26, and at the same time block 26 swings upwardly to permit the fruit to pass beneath the same. In swinging upwardly block 26, if the fruit is not large, merely pivots upon arm 23, but if the fruit is relatively large arm 23 may also swing upwardly a certain amount. As the fruit passes beneath the block it is by virtue of the angular setting of the block, crowded toward the inner side 13 of the runboard and brought into positive engagement with roller 42. Roller 42 is thereupon positively moved into slot 46, to close the electrical contacts 52 and 56. Upon closing of these contacts a registration is then made upon the counter 66.

It is characteristic of my counting device that it is practically impossible for an article of fruit to pass beneath presser block 26, without effecting positive movement of roller 42. This is true even though the fruit may vary as to shape and size, within certain limits. Furthermore when articles of fruit pass in close succession beneath the block 26, each fruit is separately registered, and it is substantially impossible to secure one count for two or more articles of fruit. When it is desired to count fruit of decidedly larger or smaller dimensions, the operator merely makes the proper adjustment of journal block 19 upon bracket 17. Because of the angle at which bracket 17 is set, the operation of the presser block 26 is substantially the same for any one adjusted position.

In Figs. 5 to 8 inclusive, in place of having movements of roller 42 operate electrical contacts which in turn control an electrical circuit, I have shown a direct mechanical connection between the counter and the lever 44 carrying roller 42. Thus referring to Fig. 7, in this instance lever 44 carries a plate 49, upon which is mounted a leaf spring 78. The free end of leaf spring 78 engages a roller 79, which is carried upon one end of the lever 81. Lever 81 is fulcrumed as at 82, and is connected to the lever 83 of counter 84, by means of link 86. A cantilever wire spring 88 serves to bias lever 81 in such a direction as to urge roller 79 into engagement with leaf spring 78. Thus lever 44 and roller 42 are always urged to a position such as shown in Fig. 5, in which a portion of the periphery of roller 42 projects from the side 13 of the runboard 12.

The operation of the last described modification is the same as that first described, except that oscillating movements of lever 44 as roller 42 is engaged by successive articles of fruit, is directly translated to lever 83 of counter 84.

I claim:

1. In a fruit counter adapted for use with a conveying belt, a runboard extending along one side of said belt and a register actuating means projecting through said runboard, the combination of a planar block, and means for resiliently mounting said block with its plane face at an angle to said belt and to said runboard for urging fruit aaginst said actuating means.

2. In a fruit counter adapted for use with a conveying belt, a runboard extending along one side of said belt and a register actuating means projecting through said runboard, the combination of a planar block arranged to form with said belt and said runboard a triangular passage, a pivotally mounted arm pivoted to said block, a spring restraining pivotal movement of said block on said arm, and a spring restraining pivotal movement of said arm.

3. In a fruit counter, a conveying belt, a runboard extending along one side of said belt, a register actuating means projecting through said runboard, and a planar block yieldingly mounted with respect to said runboard individually to urge fruit of different sizes to contact said belt and said runboard simultaneously.

4. In a fruit counter adapted for use with a conveying belt, a runboard extending along one side of said belt and a register actuating means projecting through said runboard, the combination of a planar block arranged in transverse alignment with said actuating means, and means for yieldingly urging said block toward said belt and toward said runboard.

5. In a fruit counter, a conveying belt, a runboard extending along one side of said belt, a register actuating means projecting through said runboard, and a planar block yieldingly mounted with respect to said runboard and said belt opposite said actuating means to provide a passage substantially triangular in cross section for fruit.

FRANK AHLBURG.